Figure 3:
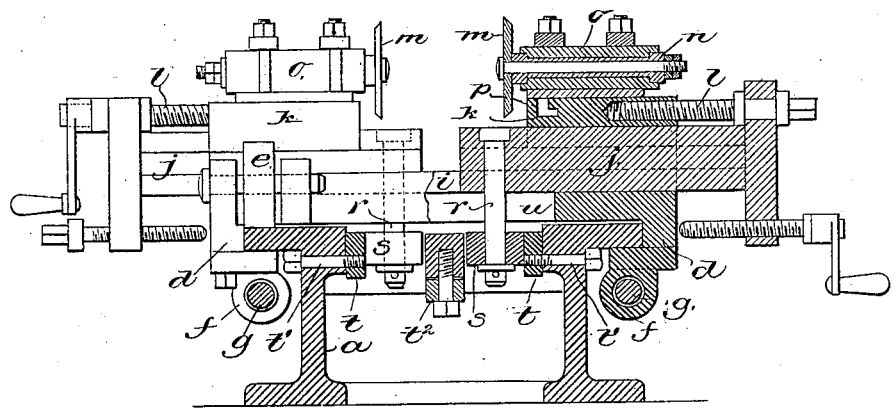

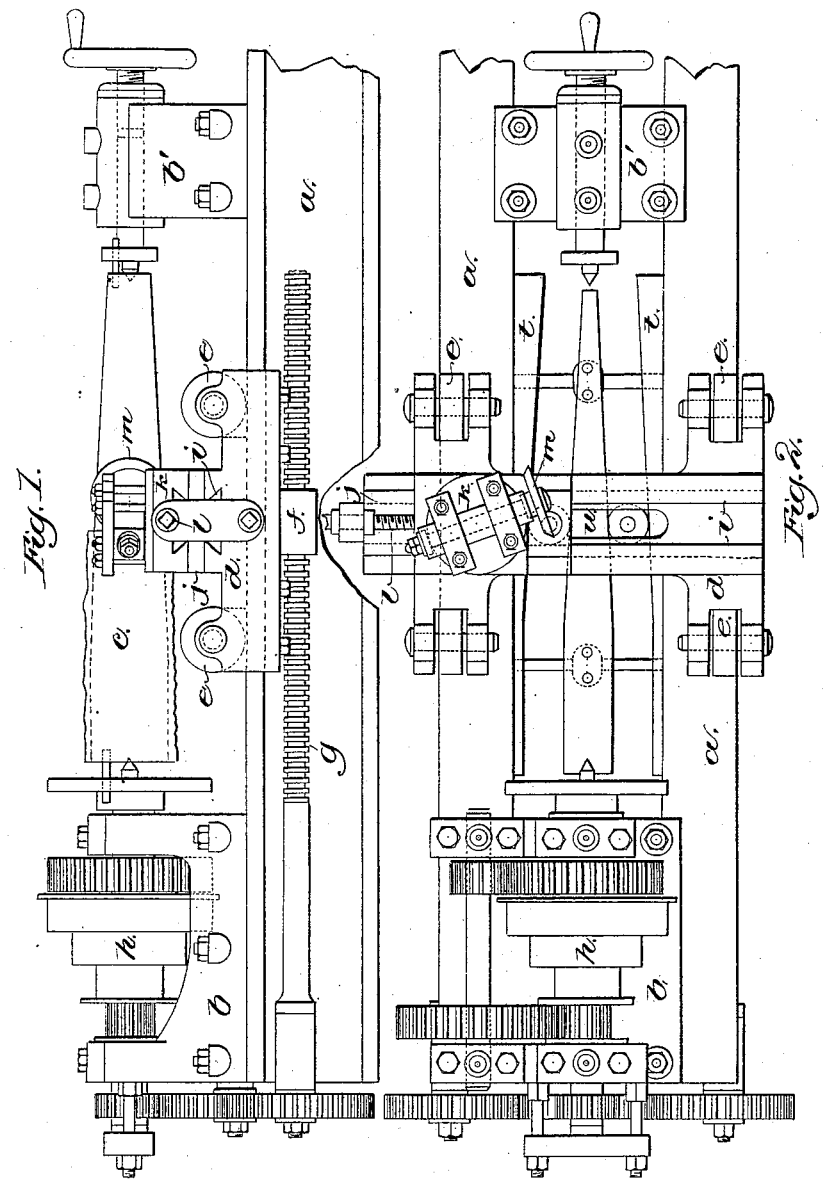

(No Model.)　　　　　　　　　　　　　　2 Sheets—Sheet 2.
E. R. CHENEY.
STONE LATHE.

No. 265,581.　　　　　　　　　Patented Oct. 10, 1882.

Witnesses.　　　　　　　　　　　Inventor:
John F. C. Brinkert　　　　　　　Ethan R. Cheney
Fred A. Powell　　　　　　　　　by Crosby & Gregory
　　　　　　　　　　　　　　　　　　　　atty's.

UNITED STATES PATENT OFFICE.

ETHAN R. CHENEY, OF CHELSEA, MASSACHUSETTS.

STONE-LATHE.

SPECIFICATION forming part of Letters Patent No. 265,581, dated October 10, 1882.

Application filed June 10, 1882. (No model.)

*To all whom it may concern:*

Be it known that I, ETHAN R. CHENEY, of Chelsea, county of Suffolk, State of Massachusetts, have invented an Improvement in Stone-Lathes, of which the following description, in connection with the accompanying drawings, is a specification.

My invention relates to an apparatus for turning stone columns, and is intended as an improvement on the apparatus shown in Letters Patent No. 122,222, dated December 26, 1871. In the said patent a lathe-bed was shown having the usual head and tail stocks for rotating the column of stone to be turned or dressed, the said lathe-bed also having two additional beds or guideways, one at each side of a tool-carriage, having the usual means for adjusting the position of the tool, which consists of a rotating cutter or disk, the sharp periphery of which is pressed against the stone and rotated thereby as the surface of the stone moves over the cutter and is disintegrated by it. In the said patent the tool-carriages at either side were moved longitudinally relative to the shaft or column being turned by hand-operated feed mechanism, and the tools were adjusted on their bearings by hand, so as to act on the surface of the stone in the proper places to give it the desired conformation, thus requiring the constant attention of one or more workmen.

The present invention has for its object to control the feed and varying position of the tool or tools automatically, so as to turn the stone to any predetermined shape without the attention of workmen.

The invention is embodied in a lathe provided with means for centering and rotating the shaft that is being cut, it having a carriage mounted to travel longitudinally on the lathe-bed and operated by feed mechanism connected with the rotary spindle of the lathe. The said carriage has tool-holding heads adapted to slide in the said carriage transversely to the lathe-bed, they being engaged and moved by a pattern-surface as the said carriage is fed along the lathe-bed. The tool may be adjusted in any usual way relative to its carrying-head and the column being cut, after which it will be moved in a definite path relative to the said column, its radial movements being controlled by the pattern-surface to give the column any desired conformation corresponding to the said pattern-surface. There will preferably be two tools—one cutting on each side of the column, one a little in advance of and cutting to a less depth than the other—and each will be controlled by an independent pattern-surface.

Figure 4:
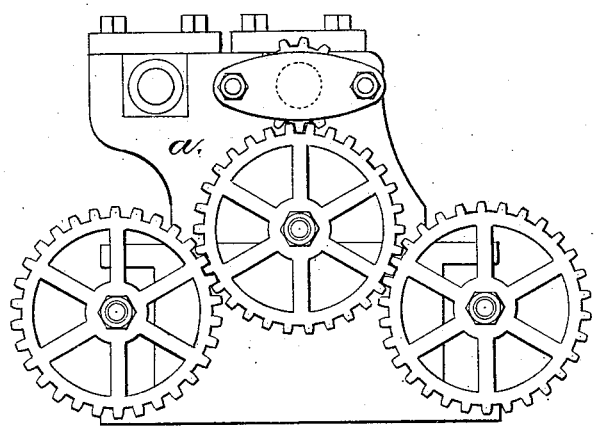

Figure 1 is a side elevation of a sufficient portion of a stone-lathe to illustrate this invention; Fig. 2, a plan view thereof; Fig. 3, a transverse section, and Fig. 4 an end elevation, thereof.

The lathe-bed *a*, provided with head and tail stocks *b b'* for centering and rotating the column *c*, Fig. 1, may be of any usual construction, these parts forming no part of the present invention.

The tool-carriage *d* extends completely across the lathe-bed, and is provided with rollers *e* to enable it to be moved easily along the said lathe-bed, it being provided with threaded lugs or nuts *f*, co-operating with the feed-worms *g*, one at either side of the lathe-bed, actuated with equal movement by suitable gearing connected with the spindle and cone of pulley *h*, by which the column *c* is rotated in the usual manner. (See Fig. 4.) The said tool-carriage *d* is provided with guideways *i*, transverse to the lathe-bed, in which are mounted slide-blocks *j*, carrying the tool-heads *k*, also adapted to slide transversely to the lathe-bed upon guides in the blocks *j*, and having their position adjusted in the said blocks by means of screws *l* entering threaded sockets in the said head *k*.

The cutting-tools *m* consist of sharp-edged disks bolted upon a tubular spindle, *n*, having a free rotating movement in a socket-block, *o*, that can be bolted in any desired angular position upon the head *k*, which is provided with L-shaped grooves *p* to receive the head of the fastening-bolts in any desired position. The tools, when thus bolted to the head *k* and adjusted by the screw *l* relative to the block *j*, will have no further movement relative to the said block, but will accompany it in its movements in the carriage *d*, and with the said carriage as it is fed along the said lathe-bed. The said blocks *j* are moved in the guides *i* of the carriage *d* to change the position of the cutter *n* radially relative to the shaft *c*, so as to reduce the said shaft to a greater or less diameter in its different portions by means of pins $r$, provided with rollers $s$, that are acted upon by the pattern-surface $t$ as the carriage moves along the lathe-bed when actuated by the feed-screws $g$. The said pins $r$ pass through a transverse slot, $u$, in the carriage $d$, (see Fig. 2,) and it will be seen that the sides of the completed column $c$ will correspond in shape with the pattern-surface $t$, which is fastened upon the lathe-bed by bolts $t'$, so that it can be readily removed and replaced by another of different configuration when desired.

As herein shown, an additional pattern-surface, $t^2$, parallel with the surfaces $t$, is employed, so that the blocks $s$, slide-blocks $j$, and tools $m$ are positively retained in a definite path; but the said pattern-surface $t^2$ will usually not be needed, as the resistance of the material being cut will usually keep the tools pressed radially outward as far as the pattern-surface $t$ will permit.

I claim—

1. In a lathe for turning stone, the combination of the following elements, namely: the lathe-bed, longitudinal pattern-surface mounted thereon, the longitudinally-movable carriage provided with transverse guideways, and automatic feed mechanism therefor, the tool-carrying heads mounted in the said guideways of the carriage, the rotating disk-cutting tools thereon, and the pins connected with the said tool-carrying heads, and provided with rollers engaging the pattern-surface on the lathe-bed, substantially as and for the purpose set forth.

2. The lathe-bed and carriage provided with transverse guideways mounted on rollers on the said bed, combined with automatic feed mechanism for the said carriage, tool-carrying heads mounted in the transverse guides thereof, and rotating disk-cutting tools thereon, and a pattern-surface governing the position of the said tool-carrying heads in the guideways of the carriage as the latter is fed along the lathe-bed, whereby a column is automatically turned to any desired shape, substantially as described.

In testimony whereof I have signed my name to this specification in the presence of two subscribing witnesses.

ETHAN R. CHENEY.

Witnesses:
G. W. GREGORY,
JOS. P. LIVERMORE.